March 3, 1953

L. J. HAWORTH 2,630,563

PULSE ECHO RANGE AZIMUTH AND
ELEVATION PRESENTATION

Filed May 25, 1944

INVENTOR.
LELAND J HAWORTH
BY
William D Hall
Attorney

March 3, 1953

L. J. HAWORTH 2,630,563

PULSE ECHO RANGE AZIMUTH AND
ELEVATION PRESENTATION

Filed May 25, 1944

INVENTOR.
LELAND J HAWORTH
BY
William D Hall
Attorney.

Patented Mar. 3, 1953

2,630,563

UNITED STATES PATENT OFFICE 2,630,563

PULSE ECHO RANGE AZIMUTH AND ELEVATION PRESENTATION

Leland J. Haworth, Belmont, Mass., assignor, by mesne assignments, to the United States of America as represented by the Secretary of War Application May 25, 1944, Serial No. 537,319

3 Claims. (Cl. 343—11)

This invention relates to a communication system and is an improvement upon the system disclosed and claimed in the co-pending joint application of Leland J. Haworth and Edward M. Purcell, Serial No. 531,826, filed 19th April 1944, now Patent No. 2,606,318 issued Aug. 5, 1952. The system described in the above referred application is a radar system for searching and locating targets. The search system disclosed therein comprises the usual transmitter, receiver and antenna system with target indications being presented on a cathode ray tube screen. The antenna system is a highly directive system having a beam characteristic. In order to provide adequate scanning, means are provided for rotating the antenna, which in this instance includes a paraboloid reflector, about a longitudinal axis and also oscillating said reflector about a transverse axis. The combination of these two motions provides a spiral scan with the beam tracing increasing and decreasing spirals over the field to be scanned.

One of the important phases of the invention disclosed and claimed in said application resides in the manner of target presentation. As described therein, the target is presented in the form of a fluorescent trace consisting generally of straight lines inclined at some angle to one of the screen axes, in this particular instance, the horizontal axis. The beginning of the trace is determined by the range and azimuth of the target, while the angle of the line to the horizontal gives the elevation with respect to the antenna system. It has been found that in such a system the generation of continuous linear traces increases to an objectionable degree the ratio of signal to noise. Furthermore, the presentation of targets in this manner makes for a relatively complicated electrical system.

The invention hereinafter disclosed and claimed improves upon the invention disclosed and claimed in the above identified application by changing the target presentation. The invention herein provides a so-called two-dot system of target presentation. The two dots may be equivalent to the starting point and an additional point on the linear trace of the above disclosed system. By virtue of such a presentation, a substantial improvement in the signal to noise ratio is provided; and, in addition, the system lends itself to simplification.

In general, the presentation of a target is made by a point trace on the screen in a manner well known to the art. The location of the point may be determined by the range and azimuth of the target. The second point is obtained by merely shifting the entire frame of the scanning area on the tube screen a predetermined amount. Thus after the frame is shifted, the target is presented as a dot again but now displaced from the first dot. The displacement of the tube screen field of scan is determined by the angular coordinates of the target. It is understood that azimuth and elevation may be interchanged so that the angle of the line joining the two dots may indicate azimuth instead of elevation. It is understood that the shifting of the scanning area frame does not require the scanning of one complete frame and then the scanning of the other frame. Actually, the two frames are interleaved in a time sense, with a line or range element of one frame being generated and then followed by the corresponding line or range element of the other frame.

In general, the invention contemplates the alternate switching by means of transmitter pulses of what might be termed normal and displaced screen scanning fields.

For a more complete description of the invention, reference will now be made to the drawing wherein Fig. 1 is a diagrammatic representation of one scanning procedure illustrating several different stages in the movement of the beam, together with corresponding cycles of an alternating current wave used for controlling the beam, it being understood that the beam is actually suppressed except when target presentation data is made;

Figure 1:
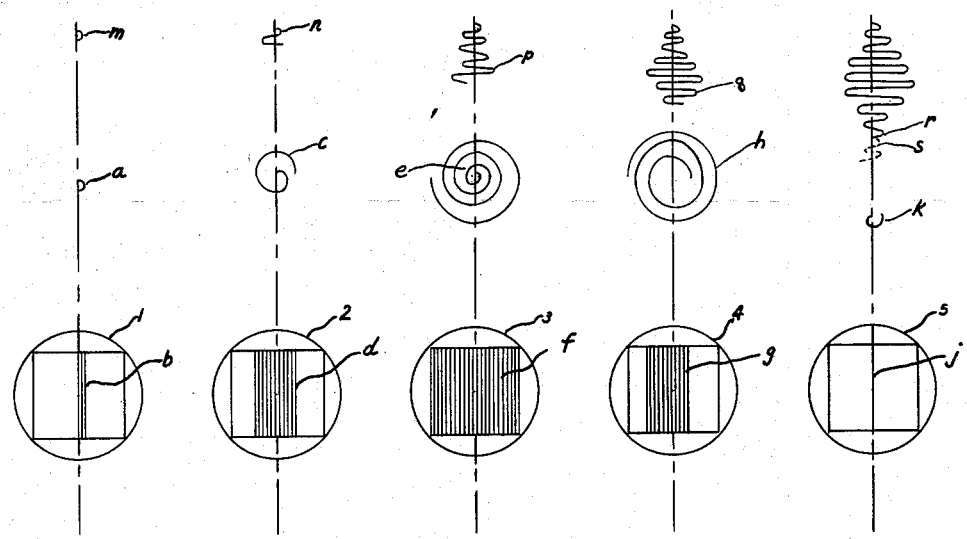

In Fig. 1 are shown five different representations of the face of a cathode ray tube 1, which may be the indicating device of the system, illustrating how the electron beam is moved to produce the relative azimuth and range of the object or objects represented on the face of the tube when spiral scan is used. As the beam of electromagnetic radiation traces the spiral scan in space, the electron beam in the cathode ray tube is caused to move from side to side, the displacement from the center of the tube at all times corresponding to the horizontal displacement of the electromagnetic beam from the axis about which the spiral is formed. At the same time the electron beam in the cathode ray tube is caused to sweep vertically from a line across the lower edge of the face of the tube to a line across the upper edge of the face each time a pulse of electromagnetic radiation is transmitted, and the rate of movement of the electron beam during each vertical sweep may be linear. The pulse rate of the electromagnetic radiation is very much faster than the movement of the electromagnetic beam in its spiral trace, and hence for every slight movement of the electromagnetic beam there will be several of these pulses. Therefore, as the electron beam in the cathode ray tube moves from side to side in synchronism with the side to side movement of the electromagnetic beam, the sweeps of the electron beam in the cathode ray tube will come very close together and will be substantialy vertical. A single field of scan on the tube screen will be assumed.

At the left in Fig. 1 the face of the cathode ray indicator tube 1 is represented at a time when the spiral scan of the electromagnetic beam starts from the center of the scanning spiral. The first half-cycle of the spiral is indicated by small, curved line $a$ immediately above tube 1. During the time that the electromagnetic beam is passing through this half-cycle at the start of the spiral scan, the electron beam in the cathode ray tube is producing perhaps as many as fifty vertical sweeps, as indicated by solid vertical lines $b$. These vertical sweeps will produce no visible indication on the face of the tube, as will be later explained.

Circle 2 in Fig. 1 represents the face of indicator tube 1 after the spiral scan has passed through a cycle and a quarter shown at $c$. The repeated vertical sweeps have moved toward the left across the center line of the tube and have moved back again toward the right as the spiral completes the next quarter cycle, the lines passing farther to the right as the electromagnetic beam reaches the extreme right side of the spiral turn. This is shown at $d$.

Circle 3 represents the face of indicator tube 1 at the time when the electromagnetic beam has reached the maximum outer turn of its spiral, this turn being indicated at $e$ in the spiral immediately above circle 3. The repeated sweeps of the electron beam of the cathode ray tube by this time have reached the extreme left and right side of the tube, as represented by lines $f$, so that the entire face of the cathode ray tube has been covered by the repeated vertical sweeps of the electron beam. Each turn of the spiral requires the same time as every other turn, and, since there are the same number of sweeps for each cycle, it will be seen that, as the radius of the spiral increases, the vertical sweeps will be farther apart.

Now the radius of the spiral which the electromagnetic beam is tracing begins to decrease, and vertical lines $g$ on cathode ray tube 1 represented by circle 4 will be formed, with their maximum side positions nearer and nearer to the center, as the spiral decreases in radius. Spiral $h$ immediately above circle 4 illustrates the second half of the spiral where the radius is receding, the first half, shown above circle 3 having been omitted for clearness. The width of the portion of the tube covered by lines $g$ is shown as corresponding to the inner half-cycle of spiral $h$.

As the spiral continues to decrease in radius, the vertical lines approach nearer and nearer to the center until a single line $j$ is formed at the center, as indicated in circle 5 which represents cathode ray tube 1 at the end of a complete scanning cycle. The last three-quarter turn of the spiral is indicated at $k$.

It will thus be seen that repeated vertical sweeps of the electron beam in cathode ray tube 1 are caused by the repeated pulses of electromagnetic radiation and that these sweep lines are caused to start from the center of the cathode ray tube when the axis of the electromagnetic beam coincides with the axis of revolution and to move from side to side, reaching ever-increasing distances from the center as the electromagnetic beam traces its spiral path, and then, after the maximum position has been reached, to continue to move from side to side but with ever-decreasing distances from the center of the tube, as the spiral trace approaches its center again. This causes the vertical sweeps of the cathode ray tube to have a bellows-like action as the electromagnetic beam scans the field in a spiral pattern.

Simultaneously with the spiral scanning of the electromagnetic beam, an alternating voltage, preferably in the general form of a sine wave, is produced in a manner to be later described at a frequency equal to the frequency of revolution of the electromagnetic beam and having an instantaneous value which is proportional to the cosine of the angle of revolution of the beam. Thus one cycle of the alternating voltage corresponds to one cycle or turn in the spiral path of the electromagnetic beam. This alternating voltage is modulated, in a manner to be later described, by the movement of the electromagnetic beam from side to side. This alternating voltage is illustrated diagrammatically by the sine wave represented above each of the spiral diagrams in Fig. 1. Thus curve $m$ represents a half-cycle of the sine wave as it starts from zero and rises to an amplitude corresponding to the horizontal displacement of the electromagnetic beam. Wave $n$ shows that portion of the sine wave corresponding to spiral curve $c$, the amplitude having increased. Wave $p$ shows the sine wave at its maximum amplitude when the electromagnetic beam has moved to its outermost position. Thereupon the amplitude of the sine wave starts to decrease, as indicated in wave $q$, corresponding to spiral $h$ of decreasing radius, and wave $r$ indicates the voltage sine wave reducing to zero again by the electromagnetic beam crossing the center of its field of scan where it coincides with the axis of revolution. As the electromagnetic beam crosses the center, the phase of the sine wave is reversed, as indicated by dotted line $s$, in a manner and for a purpose to be later described.

Figure 2:
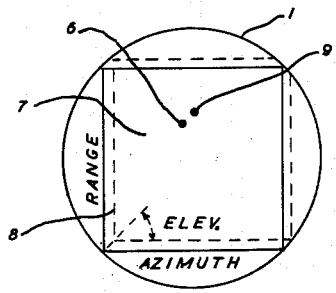
Fig. 2 is a front view of a cathode ray tube screen showing target presentation of the system.

In Fig. 2 is shown a representation of the face of cathode ray tube 1 with the type of indication produced by spiral scanning of the electromagnetic beam, as described above. The electron beam of the cathode ray tube continues to sweep vertically as each pulse of electromagnetic radiation is transmitted, the beam tracing invisible lines which have been represented in Fig. 1 as lines $b$, $d$, $f$, $g$ and $j$. These may be entirely invisible until reflected radiation received by the apparatus is caused to intensify the beam. When the signal caused by such reflected radiation from an object in space is received, the electron beam is intensified, so that a spot of light 6 is produced on the face of the tube in a manner well known in the art. This spot is produced by the beam covering what might be called the normal field of scan 7 on the tube screen. When the next target echo has been received by the system, the field of scan of the beam on the screen of the tube has been shifted as shown by the dotted rectangle 8 so that the spot of light due to the target is correspondingly shifted as shown at 9.

While the shift of the field of scan of the tube may be in any direction, it is preferred to move the same in the same direction at all times to provide for uniform target presentation. To this end, the shifted field of scan of the beam on the screen of the tube will be moved to the right, either up or down with reference to the original field of scan, depending upon the elevation angle. Thus if the elevation angle is positive, namely above the observer, then the shifted field of scan will be moved to the right and up. Conversely, if the angle of elevation is negative, or the target is below the observer, then the shifted field of scan will be moved to the right and below the original field of scan. In the event that the elevation angle is zero, in which case the target is on a level with the observer, then the shifted frame will be moved to the right, and the two target dots will be horizontally in line. It is evident that the analysis of beam travel for Fig. 1 requires a vertical displacement of lines to accommodate elevation data.

As disclosed in the aforementioned Haworth and Purcell application, the antenna system is a relatively complicated mechanism whereby a dipole and paraboloid reflector are spun around the paraboloid axis while the dipole and paraboloid are rocked transversely to said axis. Inasmuch as many modifications of the mechanism for accomplishing spiral scanning are possible, no detailed description of such mechanism will be given; and for a complete disclosure of such mechanism, reference will be made to the aforementioned joint application.

Figure 3:
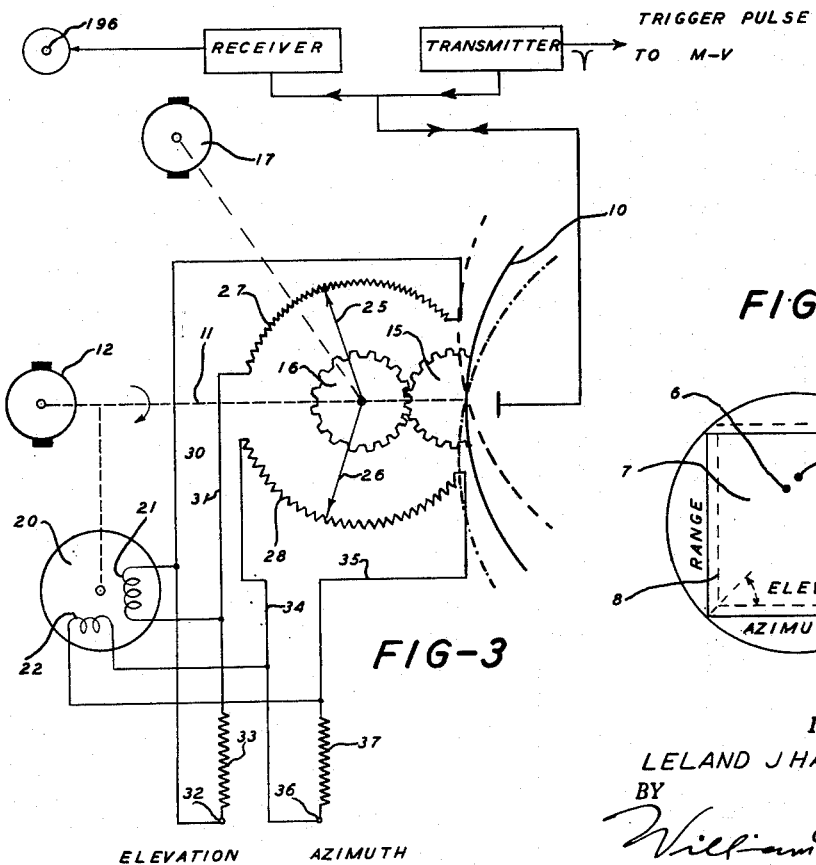
Fig. 3 is a circuit diagram, partly in blocks, of the two-phase generating system associated with the antenna to provide voltages whose amplitude and phase correspond to the location of the antenna beam in space.

Referring now to Fig. 3, a paraboloid 10 is shown diagrammatically, it being understood that this paraboloid includes a properly disposed dipole with reflector so that proper radiation of energy from paraboloid 10 may be effected. Paraboloid 10 is spun on its axis 11 by a suitable motor 12. At the same time, paraboloid 10 is rocked back and forth by a sector gear 15 engaged by a gear 16 driven by a rocking motor 17. It is understood that motor 17 oscillates paraboloid 10 up and down as shown in dotted positions, the oscillations being effected either by repeated reversal of motor 17 as disclosed in said joint application or by some oscillating mechanism between a continuously running motor and paraboloid 10. In any event, it is to be understood that gear 16 and sector gear 15 have a limited field of travel for oscillating paraboloid 10 with respect to axis 11.

Spin motor 12 also drives a two-phase generator 20 which is accurately geared to the motor shaft with respect to paraboloid 10. Thus two-phase generator 20 is driven in one-to-one timed relation. Two-phase generator 20 has windings 21 and 22 in each of which is generated a sine wave. Since these waves are displaced 90°, one may be considered as a cosine wave, while the other is a sine wave. By properly timing the mechanical connection between generator 20 and paraboloid 10, it is possible to have the peak of one sine wave coincide with a predetermined spin position of paraboloid 10. Thus, as one example, when the paraboloid system is in the position shown in the drawing, namely with gears 15 and 16 vertical, the instantaneous voltage from winding 21 may be zero, while the voltage from winding 22 will be at maximum. Hence the output of winding 21 may be considered as a sine wave and the output of winding 22 as a cosine wave. It is evident that since the rotor of generator 20 has its rotary position corresponding at any instant to the rotary position of paraboloid 10 that the instantaneous voltages generated will correspond to the instantaneous angle of the paraboloid system with reference to some fixed position where the angle is arbitrarily taken to be zero.

Since the output of generator 20 only gives indications of the rotary position of paraboloid 10, it is necessary to provide an additional means for giving an instantaneous indication of the eccentricity of the paraboloid, namely the deflection or rocking of the paraboloid from its normal symmetrical position as shown in full lines. To this end, gear 16 may have controlled thereby a pair of wipers 25 and 26 running over potentiometer windings 27 and 28. It is understood that potentiometer windings 27 and 28 are wound in such a fashion that rotary movement of wipers 25 and 26 will vary the effective resistance of potentiometer windings 27 and 28 to grounded gear 16. Potentiometer winding 27 has leads 30 and 31 connected across the ends thereof and to which are connected generator windings 21. Lead 30 goes down to a terminal 32, while between this terminal and lead 31 is a load resistance 33. Similarly, potentiometer winding 28 has leads 34 and 35 across which generator winding 22 is connected. Lead 34 goes to a terminal 36, and between this terminal and lead 35 is a load resistance 37.

It is clear that between terminal 32 and ground there will be a sinusoidal voltage due to winding 21 with the amplitude thereof modulated by the movement of wiper 25 on potentiometer winding 27. Similarly, between terminal 36 and ground there will be an amplitude modulated cosine wave. This two-phase generating system is shown in more detail and described in the joint application previously referred to.

A receiver and transmitter shown in blocks (Fig. 3) may be connected by a suitable line or transmission system to a dipole cooperating with paraboloid 10. In accordance with usual practice, switching means between the receiver and transmitter may be provided for protecting the receiver against transmitter energy and disconnecting the transmitter during the time between transmitter pulses when the receiver is sensitive to target echoes. From the transmitter a line is provided for conducting a trigger pulse to the indicating system to be described. This pulse may be derived either from the transmitter, as shown, or from a separate timer.

Figure 4:
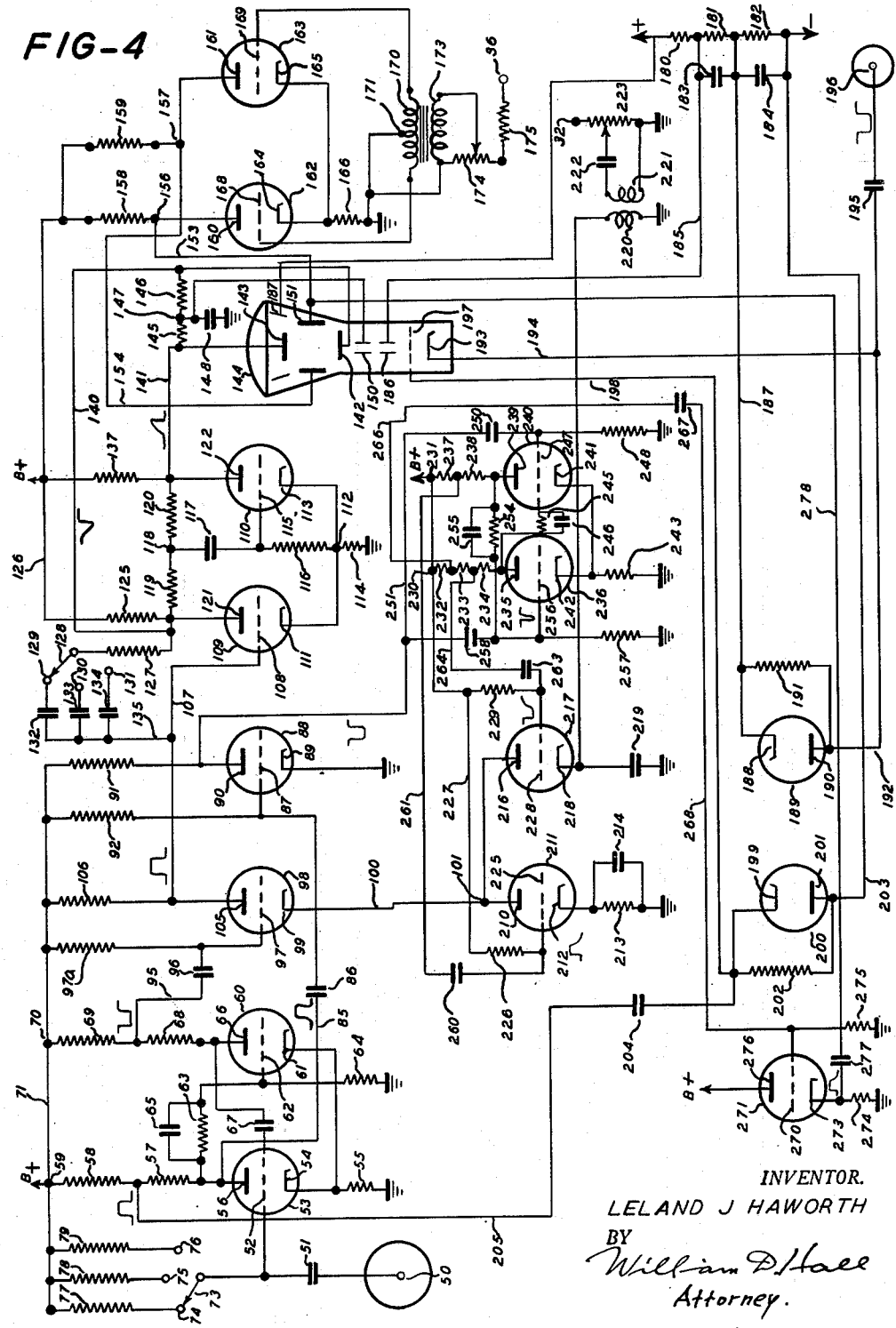
Fig. 4 is a circuit diagram of the indicating portion of the system.

Referring now to Fig. 4, a trigger pulse receiving terminal 50 is provided. Terminal 50 is connected through a blocking condenser 51 to grid 52 of a vacuum tube 53. Vacuum tube 53 has its cathode 54 connected to ground through a suitable bias resistor 55, while its anode 56 is connected through a pair of load resistors 57 and 58 in series to a junction point 59 and thence to a suitable source of B+ potential. Cooperating with vacuum tube 53 is a vacuum tube 60 to form a delay multivibrator. Vacuum tube 60 has its cathode 61 connected to cathode 54. Grid 62 of this tube is connected between two resistances 63 and 64 forming a voltage dividing network between anode 56 and ground. Across resistance 63 is a condenser 65. Vacuum tube 60 has its anode 66 connected back to grid 52 through a blocking condenser 67, while the anode itself is connected through two load resistors 68 and 69 in series to a junction point 70 connected to junction 59 by a wire 71.

Grid 52 of tube 53 is also connected to the movable contact 73 of a switch having three contacts 74, 75 and 76. These contacts are connected respectively through suitable resistances 77, 78 and 79 back to junction 59. Normally grid 52 of tube 53 is biased above cutoff by connection through movable contact 73. The normal bias of grid 62 of companion tube 60 is below cutoff with reference to its cathode 61 whose potential is raised above ground due to the drop in bias resistance 55. Upon the occurrence of a negative pulse in terminal 50, grid 52 is driven to cutoff. The sharp rise in voltage at anode 56 is communicated through condenser 65 to grid 62 and causes tube 60 to become conducting. This results in a drop at anode 66 which drop is communicated through blocking condenser 67 to grid 52 and thus provides for the almost instantaneous change in tubes 53 and 60, respectively. After a predetermined interval of time determined by the constants of the RC circuit for grid 62, the two tubes revert to their former condition where tube 60 is cutoff and tube 53 is conducting. The position of movable contact 73 will determine in some measure the speed of return of the multivibrator to its biased condition, in addition to the RC time of grid circuit 62. The various switch positions are provided for various pulse repetition frequencies incident to a change in range of the system.

From anode 56 of tube 53 a connection 85 is taken which goes through a blocking condenser 86 to control grid 87 of an amplifier 88. Amplifier 88 has its cathode 89 grounded, or it may be connected through a suitable bias resistance depending upon the characteristics of the tube. Tube 88 has its anode 90 connected through a load resistor 91 to wire 71 which for all practical purposes may be considered to be a source of B+ potential. Grid 87 is also connected through a suitable bias resistance 92 to wire 71. Similarly, from the junction of load resistors 68 and 69 in the anode circuit of vacuum tube 60 a lead 95 is provided going to a blocking condenser 96 and thence to grid 97 of a vacuum tube amplifier 98. Grid 97 is biased by a resistor 97a connected to wire 71. The cathode 99 of this amplifier is connected by a lead 100 to junction point 101 and which for the present may be considered to be a source of fixed cathode bias. Vacuum tube 98 has its anode 105 connected through a load resistor 106 to wire 71.

Anode 105 is also connected through a lead 107 to control grid 108 of one of a pair of vacuum tubes 109 and 110 functioning as a split phase saw-tooth generator. Vacuum tube 109 has its cathode 111 connected to junction point 112. Cathode 113 of vacuum tube 110 is also connected to junction point 112, and this junction point is connected to ground through a bias resistor 114. Vacuum tube 110 has its control grid 115 connected to junction point 112 through a resistance 116, and this grid is also connected through a blocking condenser 117 to a junction point 118. Junction point 118 is connected through resistances 119 and 120 to anodes 121 and 122 of vacuum tubes 109 and 110, respectively. Anode 121 is connected also through a load resistor 125 to a wire 126 which may function as a source of B+ potential. Anode 121 is also connected through a resistance 127 to the movable contact 128 of a switch having three fixed contacts 129, 130 and 131, respectively. These three contacts are connected through blocking condensers 132, 133 and 134, respectively, to a lead 135 going down to wire 107. The position of movable contact 128 is governed by the position of movable contact 73 in the delay multivibrator circuit, since the sweep generating system 109 and 110 and associated circuits must have a sweep duration properly correlated with the range of the system.

Anode 122 of vacuum tube 110 is connected through a load resistor 137 to wire 126. Under normal conditions, vacuum tube 98 conducts so that the potential at anode 105 is relatively low. This potential is impressed upon control grid of vacuum tube 109. However, cathode 111 of this vacuum tube is normally biased through resistance 114 so that vacuum tube 109 is normally at cutoff. Upon the occurrence of a positive rectangular pulse at anode 105, grid 108 of vacuum tube 109 goes positive above cutoff, and vacuum tube 109 begins to conduct. This would normally cause the potential at anode 121 to drop heavily because of the drop in resistance 125. However, one of the three condensers, in this case condenser 132, which has been charged to a potential existing between B+ in 126 and the potential at anode 105 begins to discharge through resistance 127. The time constant of this is adjusted with relation to the rest of the circuit so that the potential at anode 121 drops to form a negative saw tooth. This negative saw tooth is impressed upon control grid 115 of vacuum tube 110 and results in the creation of a positive saw tooth at anode 122 of this vacuum tube. The negative saw tooth is conducted from anode 121 of tube 109 by a wire 140, while the positive saw tooth is conducted from anode 122 by a wire 141.

Wires 140 and 141 lead to vertical deflecting plates 142 and 143, respectively, of a cathode ray tube 144. Connected across wires 140 and 141 are resistances 145 and 146 whose junction 147 has a grounded blocking condenser 148 connected thereto. Junction 147 is also connected to one of the focusing electrodes 150 of the cathode ray tube. The cathode ray tube has horizontal deflecting plates 151 and 152 connected by leads 153 and 154, respectively, to junction points 156 and 157, respectively. Junction point 156 is connected through a load resistor 158 to wire 126, while junction 157 is connected through a load resistor 159 to wire 126. Junction points 156 and 157 connect respectively to anodes 160 and 161 of a pair of azimuth amplifiers 162 and 163. Amplifiers 162 and 163 have their cathodes 164 and 165 connected through a common bias resistance 166 to ground. Control grids 168 and 169 of these two vacuum tubes are connected to the end terminals respectively of a transformer secondary winding 170 having a grounded center tap 171. Transformer secondary 170 is fed by a primary winding 173 across which is connected a potentiometer 174. One terminal of potentiometer 174 is connected through a dropping resistor 175 to azimuth supply terminal 36. It is thus clear that the amplitude modulated azimuth cosine wave is impressed in push-pull relation on amplifiers 162 and 163. Thus at junction points 156 and 157 there appears an amplified potential whose instantaneous value is a function of the azimuth bearing of the antenna beam. This variation in potential thus appears across the horizontal deflecting plates 151 and 152.

In order to energize the cathode ray tube, a high voltage source of potential is connected across the voltage dividing network consisting of resistors 180, 181 and 182 in series. The polarity is indicated as shown, and it is understood that the voltage may be something of the order of 5,000 or 6,000 volts. Across resistors 181 and 182 are by-pass condensers 183 and 184, respectively. At the junction point of resistors 180 and 181 is connected a lead 185 which goes to the remaining focusing electrode 186 of the cathode ray tube. The most positive part of the resistance dividing network, namely the top end of resistance 180, is connected to an auxiliary anode 187 within the cathode ray tube, this usually being in the form of a ring of carbonized material on the inside of the glass container adjacent the screen. As is well known, the purpose of this auxiliary anode is to dissipate the charge in the screen so that no electron repulsive tendencies will be generated within the tube screen.

At the junction of resistances 181 and 182 in the voltage dividing network a lead 187 goes to cathode 188 of a clamping diode 189. Anode 190 of this diode is connected through a high resistance 191 to the cathode and is also connected to a lead 192. The cathode ray tube has its cathode 193 connected by a wire 194 down to lead 192, and this same lead 192 is connected through a blocking condenser 195 to a terminal 196 leading to the receiver of the system.

The cathode ray tube has a control grid 197 connected by a lead 198 to cathode 199 of a clamping diode 200. The diode has its anode 201 connected back to the cathode through a high resistance 202, and the anode thereof is connected by a line 203 back to the negative terminal of the high voltage resistance network. Diode cathode 199 is also connected through a blocking condenser 204 and wire 205 to the junction of resistors 57 and 58. It is clear that a negative signal from receiver terminal 196 will be applied across resistor 191 and cause the cathode ray tube cathode 193 to go negative with respect to its control grid. Thus control grid 197 of the cathode ray tube, which is normally at cutoff, rises above cutoff relative to its cathode and renders the beam in the cathode ray tube visible during the time that the signal is on. At the termination of the signal, the normal bias imposed upon cathode 193 due to the drop in resistance 182 re-appears. By virtue of the presence of diode 189, the bias of cathode 193 of the cathode ray tube is kept from being driven more positive than its proper voltage.

Referring back to amplifier 98, it was stated that its cathode 99 is connected by a lead 100 to a junction point 101. Junction point 101 is connected to the anode 210 of a vacuum tube 211. Vacuum tube 211 has its cathode 212 connected through a bias resistance 213 to ground, and across this bias resistance a by-pass condenser 214 is disposed. Junction point 101 is also connected to an anode 216 of a vacuum tube 217 whose cathode 218 has a by-pass condenser 219 connected to ground. Feeding cathode 218 is a secondary winding 220 having one terminal grounded so that in effect it is disposed across by-pass condenser 219. Secondary 220 is energized by a primary 221, and this primary has in its circuit a blocking condenser 222 and a potentiometer 223 connected to terminal 32 of the elevation potentiometer. Thus cathode 218 of vacuum tube 217 has impressed thereon a sinusoidal bias whose instantaneous value corresponds to the elevation of the antenna beam.

Vacuum tube 211 has its control grid 225 connected through a resistance 226 to a wire 227. Vacuum tube 217 has its control grid 228 also connected through a grid resistor 229 to wire 227. The two vacuum tubes 211 and 217 constitute an electronic switch. Wire 227 goes to junction points 230 and 231 and thence to a suitable source of B+ potential. From junction 230 a series of three resistors 232, 233 and 234, respectively, go down to anode 235 of a vacuum tube 236. From junction point 231 two resistances 237 and 238 go down to anode 239 of a vacuum tube 240. The cathodes 241 and 242 of these two tubes are connected to ground through a suitable bias resistance 243. The anode of tube 236 is connected through a resistance 245 shunted by a condenser 246 to the control grid 247 of vacuum tube 240. This control grid 247 is also connected to ground through a suitable resistance 248. Control grid 247 is also connected to a blocking condenser 250 and lead 251 to anode 90 of amplifier 88.

Anode 239 of vacuum tube 240 is connected through a resistance 254 shunted by condenser 255 to control grid 256 of vacuum tube 236. This control grid 256 is connected through a suitable resistance 257 to ground. Control grid 256 is also connected through a blocking condenser 258 to line 251 going back to anode 90 of amplifier 88.

Control grid 225 of vacuum tube 211 is connected through a blocking condenser 260 and wire 261 to the junction of resistors 237 and 238. In the similar fashion, control grid 228 of vacuum tube 217 is connected through a blocking condenser 263 and a lead 264 to the junction of resistors 233 and 234.

The junction of resistors 232 and 233 is connected by a wire 266, blocking condenser 267 and an additional wire 268 to the control grid 270 of a cathode follower tube 271. Cathode follower 271 has its cathode 273 connected through a load resistor 274 to ground, while its control grid 270 is connected through a grid resistor 275 to ground. The anode 216 of cathode follower 271 is connected to a suitable source of B+ potential. Cathode 273 of the cathode follower is connected through a blocking condenser 277 and wire 278 back to right-hand horizontal deflecting plate 151 to the cathode ray tube.

The operation of the indicating part of the system is as follows. A negative trigger pulse at terminal 50 generates a substantially rectangular wave at the anodes of multivibrator tubes 53 and 60. A positive pulse at the junctions of resistances 51 and 58 is impressed through blocking condenser 204 on resistance 202 and diode 200 which will not affect the pulse. The resistance across the diode is sufficiently high so that for the duration of the pulse the control grid of the cathode ray tube is made positive with respect to the cathode of this tube. During the existence of this positive pulse on the grid, a signal from the receiver may be impressed upon terminal 196 and tends to drop the cathode of the cathode ray tube with respect to the grid. Thus the beam will be made visible during existence of the signal coming in from the receiver. At the same time the negative pulse from terminal 196 is applied across resistance 191 so that the cathode of the cathode ray tube has its potential stabilized.

Referring back to the multivibrator, the output thereof goes through the two amplifiers 88 and 98. The output from amplifier 88 goes to a trigger circuit consisting of two tubes 236 and 240. By virtue of the connections of these two tubes, a negative gate impulse from amplifier 88 will trigger off one of the two tubes so that where one tube may have been conducting before, it becomes non-conducting, the other tube being in the reverse condition. Thus, for example, if vacuum tube 236 is conducting, the potential at its anode 235 is at a low enough value so that control grid 247 of its companion tube 240 is below cutoff. The negative pulse from amplifier 88 is impressed on both control grids of these two tubes but will only affect tube 236. This tube will be cutoff whereupon the anode potential goes up and results in tube 240 being cut-in.

By having condensers 250 and 258 large in comparison to the remaining condensers, the time constant of the grid input circuits may be long and prevent the positive trailing edge of the pulse from triggering the circuit again.

The conducting condition of tube 236 will cause tube 217 of the electronic switch to be cutoff and similarly the conducting condition of tube 240 will cause tube 211 of the electronic switch to be cutoff. It is evident, therefore, that as the trigger circuit consisting of tube 236 and 240 is switched back and forth, tubes 211 and 217 of the electronic switch are alternately switched back and forth. When vacuum tube 211 is conducting, vacuum tube 217 is non-conducting, and the potential in line 100 is determined by the drop through tube 211. This potential serves to bias cathode 99 of amplifier 98 at a constant level. The output of amplifier 98 feeds tubes 109 and 110 with the associated networks of resistances and condensers to form a split saw-tooth wave applied respectively to the two vertical deflecting plates of the cathode ray tube.

When electronic switch tube 217 is conducting, the drop through that tube will be determined by the elevation potential which provides a bias for cathode 218. Hence this drop through tube 217 itself furnishes a bias for cathode 99 of tube 98 and results in a different bias than when tube 211 is conducting. This different bias, as pointed out before, is a function of the elevation potential existing at that instant and determines the amplitude of the rectangular wave at anode 105 of amplifier 98. This amplitude in turn determines the condition of the sweep generating circuit and controls the slope of the voltage curve generating the sweep. Thus the vertical sweep base line is changed in accordance with the elevation of the antenna at that instant.

The horizontal sweep is controlled by the azimuth potentials existing at the anodes of tubes 162 and 163. The normal azimuth potential impressed upon the horizontal deflecting plates occurs when the entire indicating system is giving its normal scan. In this condition, vacuum tube amplifier 98 is biased by means of vacuum tube 211 of the electronic switch. At that instant, vacuum tube 236 of the trigger circuit is conducting. However, when vacuum tube 236 is nonconducting at the next trigger pulse from the transmitter, the potential at the junction of resistance 232 and 233 jumps, and this jump is transmitted through blocking condenser 267 and line 268 to control grid 270 of cathode follower 271. When cathode follower 271 becomes conducting, the potential of its cathode 273 jumps, and this positive pulse is transmitted through blocking condenser 277 and is superimposed upon right-hand deflecting plate 151 of the cathode ray tube. This tends to pull the electron beam over a predetermined amount above what would normally be due to the influence of azimuth potential amplifiers 162 and 163. When cathode follower 271 is not conducting, its influence is absent.

In between successive transmitter pulses from the transmitter, vacuum tube 53 of the delay multivibrator is normally conducting. Hence the potential at the junctions of resistances 57 and 58 is low. During that time diode 200 conducts and permits the potential of the control grid of the cathode ray tube to be fixed.

What is claimed is:

1. In a radio direction and ranging system having a directional antenna movable in both azimuth and elevation and having a transmitter and receiver, said transmitter being adapted to pulse the antenna periodically and said receiver being adapted to receive target echoes during the time between successive pulses, a cathode ray tube having a fluorescent screen with a base line, means for impressing target echoes from said receiver as indications on said tube screen, said target indications including a first indication for each target located on said screen at a point having coordinates defining the range and one of the two angular coordinates of said target, means for displacing each of said first indications on said screen to provide a second discrete indication spaced from said first indication for each target, a second indication being so disposed relative to a corresponding first indication that the line joining the two forms an angle with respect to said base line to define the remaining angular coordinate of said selected target.

2. The system of claim 1 wherein the original and displaced target indications consist of bright spots.

3. In a radio direction and ranging system having a directional antenna movable in both azimuth and elevation and having a transmitter and receiver, said transmitter being adapted to pulse the antenna periodically and said receiver being adapted to receive target echoes during the time between successive pulses, a cathode ray tube having a fluorescent screen, means for intensity modulating the cathode ray of said tube with said echo pulses, means for generating a range sweep for each antenna pulse on said screen along a first rectangular coordinate axis, means for displacing said range sweep on said screen along a second rectangular coordinate axis to define one of two angular coordinates of a target, means for defining a first position of said axis on said tube screen for alternate transmitter pulses to provide a first field, means responsive to the remaining angular coordinate of said target for translationally displacing the position of said axes from said first position to a second position on said tube screen for remaining transmitter pulses to provide a second field, said second field being displaced from said first field so that a line joining corresponding points on said two fields forms an angle with one of the axes substantially equal to the remaining angular coordinate of a target.

LELAND J. HAWORTH.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,231,929 | Lyman | Feb. 18, 1941 |
| 2,312,203 | Wallace | Feb. 23, 1943 |
| 2,412,702 | Wolff | Dec. 17, 1946 |
| 2,426,218 | Hopgood | Aug. 26, 1947 |
| 2,422,361 | Miller | June 17, 1947 |
| 2,423,104 | Labin | July 1, 1947 |
| 2,427,905 | Fyler | Sept. 23, 1947 |
| 2,449,976 | Busignies | Sept. 28, 1948 |